D. HUMPHREY.
CANDY COOLING APPARATUS.
APPLICATION FILED APR. 14, 1913.
1,132,936.
Patented Mar. 23, 1915.
3 SHEETS—SHEET 1.
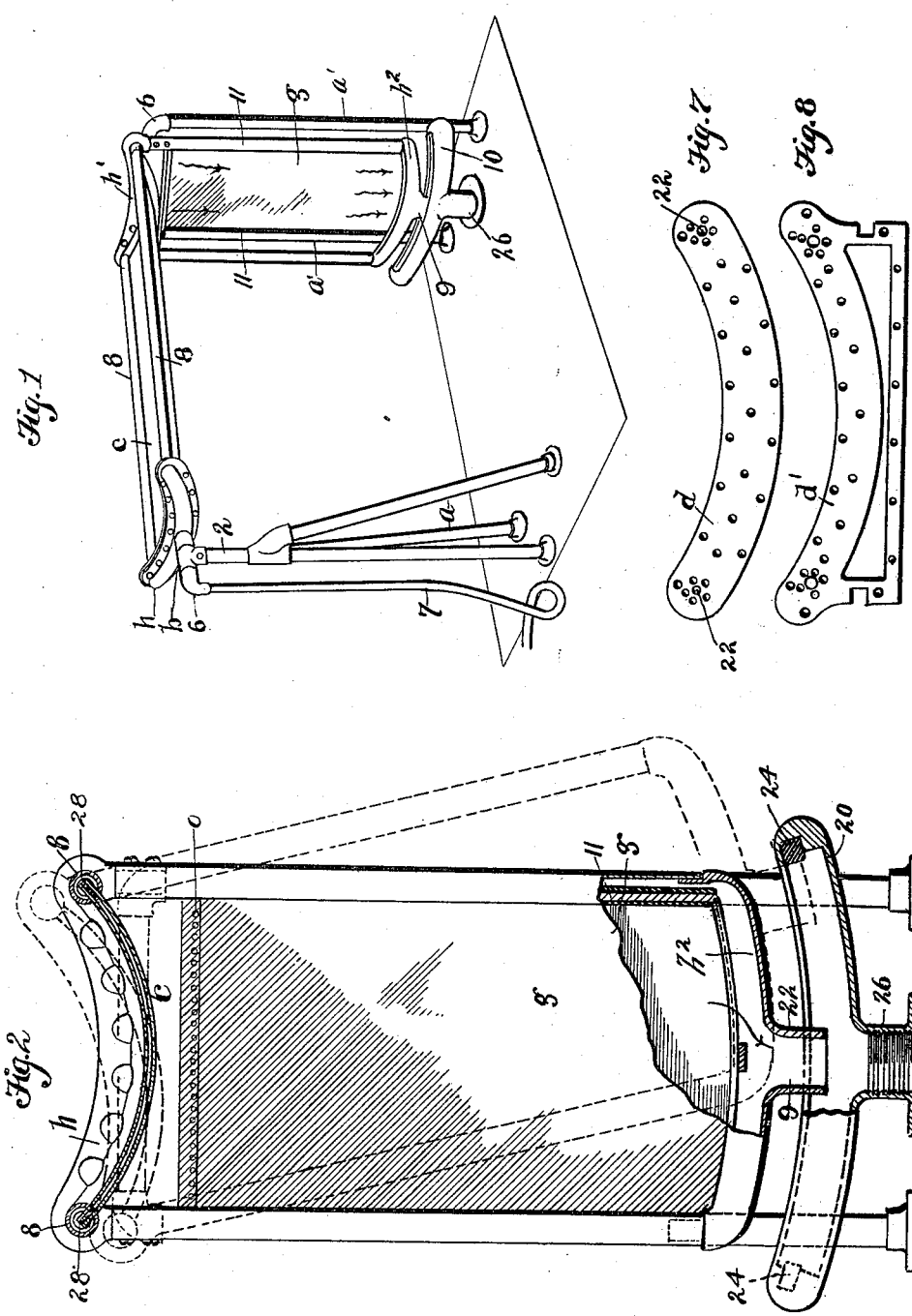
ATTEST
E. M. Fisher
J. C. Musson
INVENTOR
David Humphrey
By Fisher & Moser ATTYS.

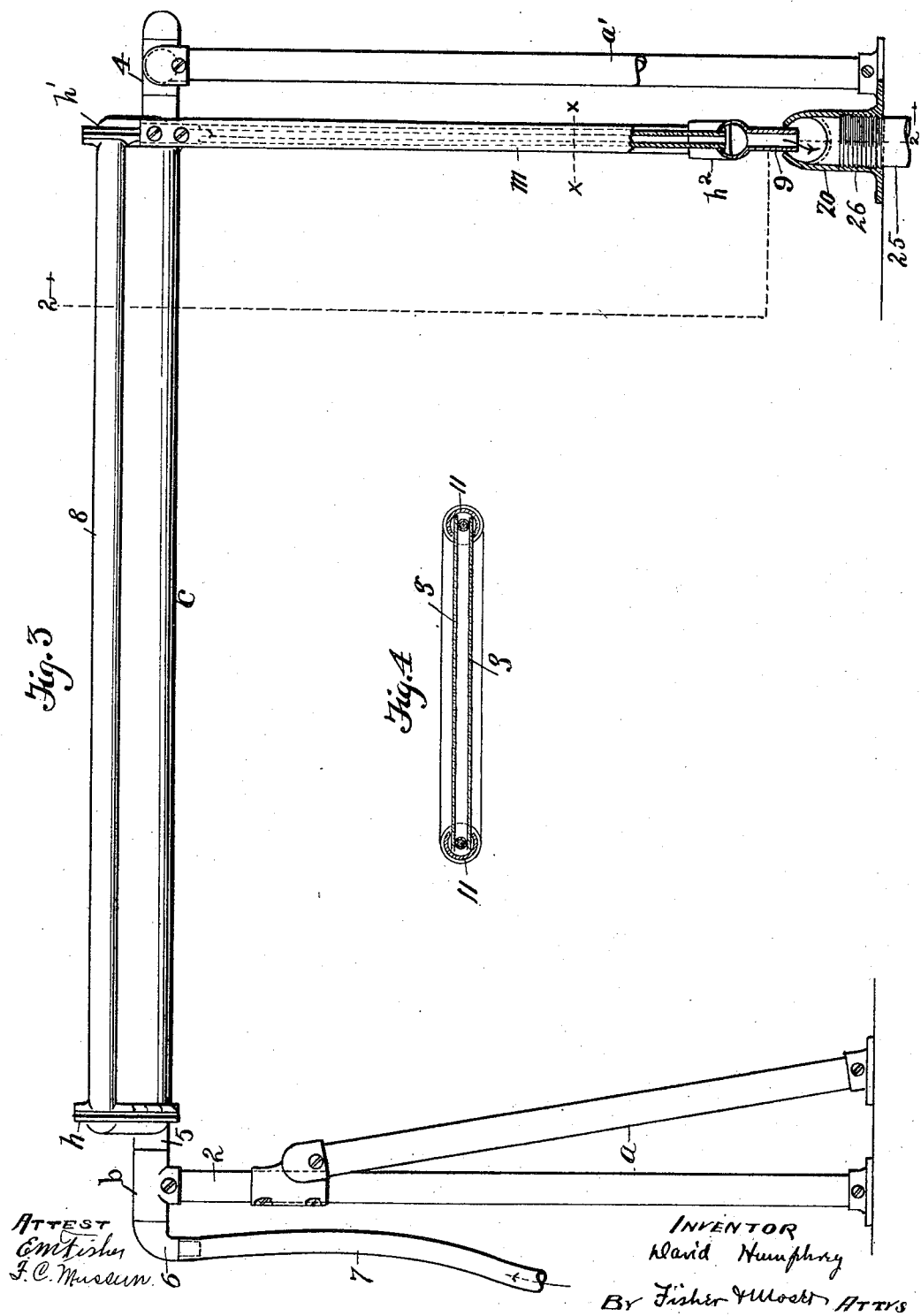

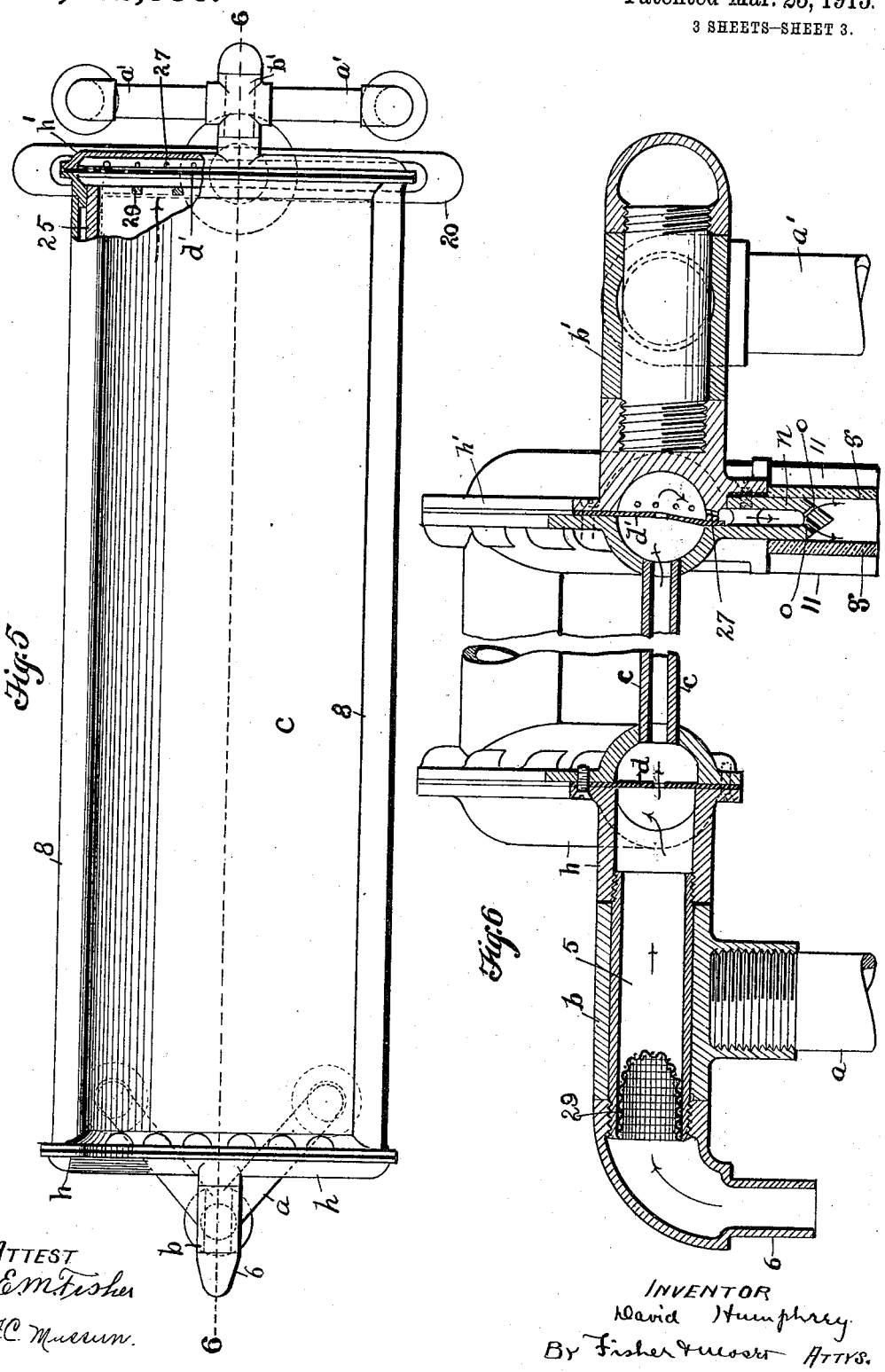

UNITED STATES PATENT OFFICE.

DAVID HUMPHREY, OF CLEVELAND, OHIO.

CANDY-COOLING APPARATUS.

1,132,936.  Specification of Letters Patent.  Patented Mar. 23, 1915.

Application filed April 14, 1913. Serial No. 761,128.

*To all whom it may concern:*

Be it known that I, DAVID HUMPHREY, citizen of the United States, residing at Cleveland, in the county of Cuyahoga and State of Ohio, have invented certain new and useful Improvements in Candy-Cooling Apparatus, of which the following is a specification.

This invention relates to candy cooling apparatus, and the invention consists in the construction and combination of parts substantially as shown and described and particularly pointed out in the claims.

In the accompanying drawings, Figure 1 is a perspective view of the apparatus, and Fig. 2 is a cross section looking to the right on line 2—2, Fig. 3, and enlarged as compared with Fig. 1. Fig. 3 is a side elevation of the device sectioned at the discharge end of its pendulum or counterweight. Fig. 4 is a cross section of the pendulum on line $x$—$x$, Fig. 3. Fig. 5 is a plan view of the apparatus partially sectioned at one end, and Fig. 6 is an enlarged vertical sectional elevation on a line centrally through the machine and broken out in the middle, said line being substantially on 6—6, Fig. 5, and disclosing the water course through the apparatus and features of construction incident thereto. Figs. 7 and 8 are detail views of the gaskets for the head ends of the apparatus.

In making candy different forms of manipulation are necessary to make it attractive and appetizing, and the manner in which the candy is cooled also plays an important part. Heretofore, the general practice has been to employ marble slabs or smoothed-off flat stones, but marble is porous, as also is stone, and the grease used to prevent the candy from sticking is absorbed by the marble and becomes rancid, putrid and disease breeding. Glass or steel are better so far as sanitation is concerned but among other objections these materials become warm too rapidly and are inefficient.

My present improved apparatus overcomes these defects and many others which menace the perfect product. To illustrate, one of the troubles in making candy is in its "freezing" or getting too cold in a brief time. This applies more particularly to what is known as pull candy. My experience and observation warrant me in saying that, with the greatest care, not more than one batch in three can be gotten in perfect condition for pulling on the hook in the old way, but with my new trough-shaped cooler there is always warm candy to mellow up the cold places and every batch is workable. Again, with my apparatus the operator can commence immediately to turn the edges of the candy, as the edges are very thin; while by any other means for cooling he must wait fifteen to thirty minutes for the candy to get cool enough to manipulate. This makes window display by my apparatus attractive because it depends on action and my machine requires action all the time. Again, by my machine the candy is deepest and warmest at the middle and hence the operator can be away, if necessary, for fifteen to thirty minutes most any time and start in again nearly where he left off without the candy becoming too cold for proper working. Furthermore, this improved cooler has about three times the capacity of any other known to me and largely because the plates of the pan are built of pure copper, which is the best conductor, and has a quality which prevents candy from sticking to it. This is not true of other metals and materials, and candy makers frequently burn their fingers because the candy on other coolers is as thick and hot at the edges as any other place. On my cooler the edges are always cool. The concave form of cooler especially prevents buckling or bulging of the metal, and since the water is under pressure it goes to all parts equally. I have in fact been experimenting for a long time to find a way to run a thin sheet of water under pressure under a thin sheet of metal without bulging the metal and making the attempt abortive, until at last I hit upon the novel and successful plan herein set forth. Another drawback is overcome by employing two sheets of curved metal plates under tension and so disposed that they are uniformly separated with a narrow space between and that the water cannot squash out from beneath where the pressure is being applied. By discharging the waste water between a transparent wall, the cooler is made very attractive for display purposes and the equalizing balance of the pendulous and weighted discharge portion of the cooler is especially advantageous in giving stability to the device in working the candy while in the pan or trough. A rocking movement of the pan or trough promotes rapid cooling of the candy by spreading it in sheet form back and forth until of uniform thickness.

The apparatus as herein shown has a support consisting of a tripod or three legs $a$ at one end and two legs $a'$ at the other end, and the tripod has an extension or stem 2 which serves as the immediate support for the cooling pan or cooler $c$ at that end. A horizontal bearing $b$ is rigid on or with said extension 2 and supports the tubular spindle 5 of the approximately T-shaped head $h$ at that end of the pan $c$. Said spindle has a nipple 6 of substantially elbow shape in this instance fixed on its outer end on which the rubber hose 7 for the inflowing water is shown as engaged. Of course any other suitable water supply connection than hose may be adopted, especially if the apparatus be built into stationary water connections. In that event, also, its leg supports might be variously changed and substituted according to conditions of location and position where the cooler is installed. The cooler or pan $c$ is transversely curved as seen in Fig. 2, and is constructed with two thin sheets of a suitable metal, say of copper, with a highly finished working surface, spaced apart relatively as shown in Fig. 2, and so as to maintain a mere film or sheet of water between them. It is of course planned to have the said water space uniform in all its portions and hence the said sheets are duplicates and spaced apart at their side edges by a suitable gasket or the like and confined in longitudinal slots in the sides or border tubes 8, but otherwise or between its sides the said space is open for the flow of the cooling water through the same from end to end. Supply of water is by the hose 7 and connections into the head $h$, and the discharge from the pan is through the opposite head $h'$ and thence into a balancing member $m$. The waste is from the bottom of said member by a tubular projection 9 at its center and bottom as hereinafter described, and said member is rigid with the cooling pan, and it acts as a sort of pendulum or counter-balance for said pan within limits as will presently be seen. The position or location of member $m$ is next within the legs $a'$ and is constructed with two transparent sheets $g$ of glass set into a suitably heavy and rigid frame of which the cross head $h'$ of the cooling pan constitutes the upper portion. That is, the cooling pan frame comprises the two heads $h$ and $h'$ and the side tubes 8 in which the edges of the pan proper are secured and sealed water tight, and the frame of balancing member $m$ comprises the head $h'$ at its top, the side tubes 11 detachably screwed to head $h'$ and the bottom head $h^2$ with which the side tubes have a rigid connection. The glass sides $g$ are flat and spaced apart relatively as seen in Fig. 6, and about the same as the plates of the cooler or thereabout, and water from the cooler or pan $c$ is discharged against the inner sides of the glass sheets from the head $h'$ through the distributing member or part $n$. The said part has a nozzle-like appearance in cross section but in fact is equal in length to the width of said glass plates and is provided with a series of holes or openings $o$ at an outward and downward inclination on opposite sides through which the water is jetted upon said glass plates, whence it flows visibly down the sides thereof to the discharge through head $h^2$ into the stationary trough-shaped part 20 beneath. The said trough, so-called, is curved to the segment of a circle between its ends corresponding to the swing of member $m$, and has a slot lengthwise in its top entered part way by the discharge projection 9 on the bottom of the head $h^2$ and which traverses said slot as the member swings from side to side in or during the manipulation of the candy. Buffers 24 in the ends of said trough serve as cushioning stops for the said discharge projection 9, and said trough itself discharges into waste pipe 25. In this instance said trough has an internally threaded neck 26 with a flange about its bottom to fix it upon the floor and in which the said pipe has screw connection.

The cooling liquid or water is suitably distributed under pressure to the cooling pan by means of a perforated rubber or like gasket or diaphragm $d$ midway in head $h$ and the main discharge of the water is preferably at the ends of this diaphragm where a group of perforations 22 are provided. If desired, the perforations which are shown at intermediate points in the gasket may be omitted to cause all the water to flow to the sides of the pan before passing through the space between the plates to head $h'$. It is also desirable to have this space practically packed with water notwithstanding that it is kept on the move and to this end a somewhat similar diaphragm $d'$ is placed in the head $h'$. The form of these diaphragms are shown in Figs. 7 and 8 respectively and diaphragm $d'$ is perforated similarly to diaphragm $d$ to restrict and distribute the water so that pan $c$ will be uniformly cooled. By having a series of comparatively small openings for the passage of the water at both ends of the pan the uniform distribution as well as the sustained pressure of the water in the pan is materially promoted. In this connection, also, and as a very material advantage in the use of my apparatus, I utilize the rocking movement of the pan as a further means of temperature equalizer of the water to offset the irregularities of heat imparted by the hot candy poured into the pan. Such rocking motion induces a transverse flow of the water which is across the end to end flow and compels uniformity of temperature of the cooling medium. A back pressure of the water to keep the cooling space of the pan c full at all times may be obtained solely by limiting the number or size of the discharge openings 27 in head h', and which openings control the flow of water to the nozzle portion n. The two curved copper plates are held apart at the sides by separating strips 28 and at their ends by spring blocks 29, see Fig. 5. No separators are used between said plates as the curvature thereof gives the necessary rigidity and strength to prevent deflection or bending of the plates between their ends under the load or any down pressure therefrom and the side tubes 8 to which the plates are soldered also serve as stiffeners. Intake nipple 6 is removable, and a gauze or wire mesh strainer 29 is placed within pipe 5 at this point to prevent foreign matter from passing into the cooler and clogging it up, especially at the small openings and perforations therein.

The cooler is relatively small for the work accomplished by it and this is of advantage as valuable space in the candy shop may be saved and utilized for other purposes.

What I claim is:

1. A candy cooling apparatus having a cooling pan constructed of two flat sheets of metal of rectangular form and curved transversely with a relatively shallow cooling space between them, and pivot supports parallel with the axis of curvature of said pan on which said pan is adapted to rock.

2. A candy cooling apparatus having an elongated cooling pan comprising two flat plates curved in cross section and united in spaced relation, water distributing connections in open communication with the interior of said pan, and means to support said pan for rocking movement on an axis extending longitudinally of said pan.

3. A candy cooling apparatus having two sheets of copper and a frame in which said sheets are uniformly spaced apart to provide a cooling space between them and distributing and retarding means at the respective ends of said pan for the cooling fluid.

4. A candy cooling apparatus having a cooling pan curved in cross section and consisting of two plates and a border frame in which said plates are spaced apart for the passage of a cooling fluid.

5. A candy cooling apparatus having a cooling pan curved in cross section and mounted on bearings at its ends, and a balancing member on one end of said pan having a passage through the same for the cooling fluid.

6. A candy cooling apparatus having a transversely curved cooling pan pivotally mounted therein, and a balancing medium rigid with said pan through which the cooling fluid is discharged.

7. A candy cooling apparatus comprising a pivotally mounted cooling pan and a balancing member on the discharge end thereof constructed with opposed sheets of transparent material spaced apart to pass the cooling fluid between them.

8. A candy cooling apparatus having a transversely curved cooling pan with an internal space in its bottom for the passage of the cooling fluid and a balancing and discharge member fixed on one end thereof having substantially the same width as said pan and consisting of two glass sheets spaced apart and adapted to swing with said pan.

9. A candy cooling apparatus having a rocking cooling pan with a raised border frame about its sides and ends and a balancing discharge member open at its top to the said pan and having a transparent side through which the flow of the cooling liquid is visible.

10. A candy cooling apparatus, comprising a cooling pan and suitable bearings at the ends thereof on which the pan is adapted to rock, a balancing member for said pan constructed to allow the cooling liquid to pass through the same and a part adapted to receive the liquid therefrom having stops for said balancing member.

11. A candy cooling apparatus, comprising a rocking cooling pan and a balancing member rigid with the discharge end of said pan and adapted to allow the cooling liquid to pass through the same, the said member having transparent sides which disclose the flow of the liquid, and means to direct the liquid against the said sides.

12. A candy cooling apparatus, comprising a pan curved in cross section and consisting of two sheets of copper spaced apart to receive the cooling medium between them and a rigid border having tubes at its sides in which the edges of said sheets are secured and sealed.

13. A candy cooling apparatus, having a suitable cooling pan, a balancing member rigid with said pan and open internally to allow the cooling liquid to pass through the same, and a device having a slot in its top into which the said member discharges.

14. In candy cooling apparatus, a rocking pan and a balancing member thereon having a discharge opening at its bottom, in combination with a part transversely disposed as to said pan and having a slot in its top and said balancing member having a tubular discharge projection adapted to oscillate in said slot and limited in its swing by the ends of the slot.

15. A candy cooling apparatus having a suitable frame, a rocking pan supported in bearings in said frame and having water inlet connections through one of said bearings and a discharge at the other end thereof, a balancing member rigid with said discharge end and open thereto for the passage of the cooling fluid and means at the lower end of said balancing member to receive the liquid therefrom and to limit the swing of said member.

16. A candy cooling apparatus having a cooling pan pivotally mounted at its ends and provided with hollow ends for the passage of the cooling fluid, and perforated diaphragms in said ends adapted to retard and distribute the flow of the fluid through said pan.

17. A candy cooling apparatus having a cooling pan adapted to rock and curved in cross section and means to distribute the inflowing water to said pan comprising a diaphragm placed across the water passage and having variously scattered perforations through which the water enters said pan at different points.

18. A candy cooling apparatus having a cooling pan and a diaphragm across the discharge end thereof for the cooling liquid provided with a series of relatively small holes for the passage of the water, whereby the flow of the water from said pan is obstructed across its end.

19. A candy cooling apparatus having a cooling pan adapted to rock on bearings and a balancing member rigid therewith and provided with a transparent side, and means to jet the waste water from said pan onto said transparent side.

20. A candy cooling pan having a water-circulating chamber lengthwise thereof provided with inlet and outlet connections, the outlet connection having transparent walls.

21. A curved candy cooling pan having a water circulating chamber provided with inlet and outlet connections, and means at the ends of said pan to distribute the water uniformly through said chamber.

In testimony whereof I affix my signature in presence of two witnesses.

DAVID HUMPHREY.

Witnesses:
R. B. MOSER,
F. C. MUSSUN.

Copies of this patent may be obtained for five cents each, by addressing the "Commissioner of Patents, Washington, D. C."